United States Patent
Jay

(10) Patent No.: US 9,303,610 B2
(45) Date of Patent: Apr. 5, 2016

(54) FUEL INJECTION UNIT, A METHOD OF OPERATING SUCH AND AN INTERNAL COMBUSTION ENGINE

(75) Inventor: David Jay, Vahakyro (FI)

(73) Assignee: Wärtsilä Finland Oy, Vaasa (FI)

(*) Notice: Subject to any disclaimer, the term of this patent is extended or adjusted under 35 U.S.C. 154(b) by 275 days.

(21) Appl. No.: 13/991,067

(22) PCT Filed: Nov. 30, 2011

(86) PCT No.: PCT/FI2011/051058
§ 371 (c)(1),
(2), (4) Date: May 31, 2013

(87) PCT Pub. No.: WO2012/072881
PCT Pub. Date: Jun. 7, 2012

(65) Prior Publication Data
US 2013/0247875 A1    Sep. 26, 2013

(30) Foreign Application Priority Data
Dec. 2, 2010    (FI) .................................... 20106274

(51) Int. Cl.
*F02M 63/02*    (2006.01)
*F02M 43/04*    (2006.01)
(Continued)

(52) U.S. Cl.
CPC ........... *F02M 63/0225* (2013.01); *F02M 43/04* (2013.01); *F02M 45/086* (2013.01); *F02M 55/04* (2013.01); *F02M 2200/315* (2013.01); *F02M 2200/40* (2013.01); *F02M 2200/44* (2013.01)

(58) Field of Classification Search
CPC ... Y02T 10/123; F02D 41/402; F02D 41/403; F02D 41/0057; F02D 41/3845; F02D 2041/389; F02D 41/3827; F02D 41/2096; F02D 41/3809; F02D 19/024; F02M 63/0225; F02M 61/10
USPC .......................... 123/447, 445, 446, 456, 457
See application file for complete search history.

(56) References Cited

U.S. PATENT DOCUMENTS 2,265,692 A * 12/1941 Kammer ................ F02M 47/00
239/89
4,022,165 A *  5/1977 Eckert .................. F02M 45/086
123/300

(Continued)

FOREIGN PATENT DOCUMENTS

EP    0778410 A1    6/1997
EP    0825341 A1    2/1998

(Continued)

OTHER PUBLICATIONS

Finnish Search Report for Finnish Patent No. 20106274 dated Dec. 21, 2012.

(Continued)

*Primary Examiner* — Lindsay Low
*Assistant Examiner* — Long T Tran
(74) *Attorney, Agent, or Firm* — Heslin Rothenberg Farley & Mesiti P.C.; Victor A. Cardona, Esq.

(57) ABSTRACT

A novel fuel injection unit for a large internal combustion engine includes a common rail fuel system. The fuel injection unit of the invention is constructed of at least a high pressure fuel accumulator specific for the fuel injection unit, a flow fuse, a first fuel injection valve with a control valve, and a second fuel injection valve with a control valve. The first fuel injection valve is a smaller one used for injecting at most 30% of the fuel required in full load operation of a diesel mode.

16 Claims, 1 Drawing Sheet

(51) Int. Cl.
*F02M 45/08* (2006.01)
*F02M 55/04* (2006.01)

(56) References Cited

U.S. PATENT DOCUMENTS

| | | | |
|---|---|---|---|
| 4,185,779 A * | 1/1980 | Watson | 239/533.3 |
| 5,647,316 A * | 7/1997 | Hellen et al. | 123/299 |
| 5,687,696 A | 11/1997 | Takagi et al. | |
| 5,711,270 A | 1/1998 | Pedersen | |
| 5,758,618 A * | 6/1998 | Jay et al. | 123/299 |
| 5,862,793 A * | 1/1999 | Jay et al. | 123/467 |
| 6,167,869 B1 * | 1/2001 | Martin et al. | 123/458 |
| 6,422,199 B1 * | 7/2002 | Buckley et al. | 123/299 |
| 6,761,325 B2 * | 7/2004 | Baker et al. | 239/533.3 |
| 6,776,139 B1 * | 8/2004 | Spoolstra | 123/446 |
| 7,431,017 B2 * | 10/2008 | Gibson | 123/446 |
| 7,556,017 B2 * | 7/2009 | Gibson | 123/299 |
| 2002/0070295 A1 * | 6/2002 | Baker et al. | 239/533.3 |
| 2004/0035398 A1 | 2/2004 | Klugl et al. | |
| 2004/0256495 A1 * | 12/2004 | Baker et al. | 239/533.2 |
| 2007/0246561 A1 * | 10/2007 | Gibson | 239/5 |
| 2008/0296413 A1 | 12/2008 | Ganser | |

FOREIGN PATENT DOCUMENTS

| | | |
|---|---|---|
| JP | 10252476 A | 9/1998 |
| JP | 2007127000 A | 5/2007 |

OTHER PUBLICATIONS

International Search Report for PCT/FI2011/051058 dated Feb. 28, 2012.
Written Opinion of the International Preliminary Examining Authority for PCT/FI2011/051058 dated Feb. 28, 2012.

* cited by examiner

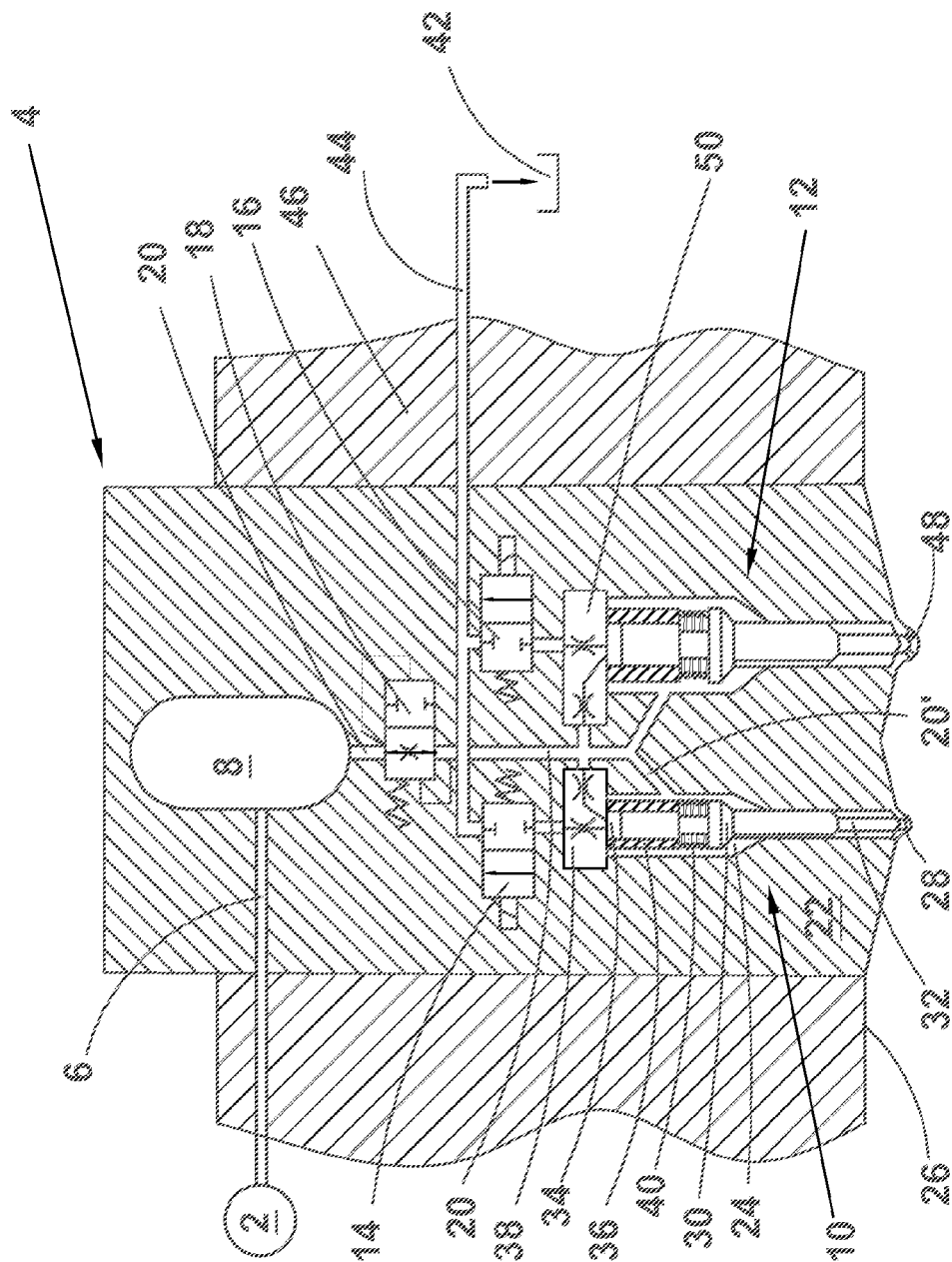

FUEL INJECTION UNIT, A METHOD OF OPERATING SUCH AND AN INTERNAL COMBUSTION ENGINE

CROSS-REFERENCE TO RELATED APPLICATIONS

This application is a 371 National Phase of International Application Number PCT/FI2011/051058 filed on Nov. 30, 2011, and published in English on Jun. 7, 2012 as International Publication Number WO 2012/072881 A1, which claims priority to Finnish Patent Application No. 20106274, filed on Dec. 2, 2010, the entire disclosures of which are incorporated herein by reference.

TECHNICAL FIELD

The present invention relates to a fuel injection unit for injecting heavy fuel oil or light fuel oil to a cylinder of a large internal combustion engine having a plurality of cylinders and using a common rail fuel system in accordance with the preamble of claim 1. The present invention relates also to a method of operating the fuel injection unit of claim 1 in accordance with the preamble of the first independent method claim.

In this specification the term "large engine" refers to such internal combustion engines in which more than 150 kW power per cylinder may be generated. Typically, this kind of large engines are used, for example, as main propulsion engines or auxiliary engines in marine vessels or in power plants for the production of heat and/or electricity.

BACKGROUND ART

In modern engines fuel is injected by means of a fuel injection valve or an injector directly into the cylinders of an engine. Since the injection occurs at a relatively late phase at the end part of the compression stroke, a sufficiently high pressure is required for the injection. In a conventional fuel feeding system, each cylinder is provided with an injection pump of its own which pumps fuel through an injection valve and an injection nozzle into the combustion chamber of the cylinder However, the use and control of the conventional system has significant limitations. The settings of the system cannot be adjusted easily. In addition the pressure in the injection pumps may vary, so that the injection into the different cylinders may take place under different pressures and may thus provide different amounts of fuel, respectively. Also, since the injection nozzles of prior art have been predominantly hydromechanical, i.e. opening at a certain predetermined fuel pressure and closing when the pressure decreases below the predetermined value, the control of the injection timing and duration should be able to take into account the wearing of the system components also during the use of the system, i.e. when the engine is running.

A more recent solution is the so called "common rail injection" or "common pressure injection", in which the provision of pressure and the injection of fuel are functionally separated from each other. Fuel is fed by means of at least one high pressure fuel pump into a common pressure supply, i.e. rail, from which it is led through separate pipes into the injector or injection valve of each cylinder. In practice, the operation of an injector is electronically controlled, for instance by means of a solenoid or piezoelectric valve, in order to obtain a sufficiently short and precise injection.

A number of the most obvious problem areas of traditional fuel feeding systems have been solved by the use of a high pressure (up to about 2200 bar) common fuel supply, and electronically controlled fuel injection valves by means of which it is, for instance, possible to inject fuel into an engine cylinder several times during the same compression stroke. In other words, the timing of the injection, the duration of the injection and the quantity of injected fuel is in clearly better control than with the fuel injection pumps of prior art, whereby also the emission levels in normal operating conditions of a piston engine have been drastically reduced.

This far the diesel engines have been optimized in view of their emissions at full load. However, the future emission legislation requires that the emission levels have to be minimized at all operating conditions. In other words, all loads spectrum tuning has to be performed. For instance, a case where even the use of modern common rail fuel system and electronic control of a fuel injection valve do not bring desired results relates to running an engine in low load, or, more generally, substantially far from its design load. The ultimate goal is to improve the injection of fuel such that the emissions of an engine throughout its operating conditions i.e. from low load to full load could be kept on minimal level.

This endeavour has led to the use of injection valves having two injection nozzles. For instance, U.S. Pat. No. 7,556,017 B2 discusses a fuel injector having an injector body defining a hollow interior configured to receive pressurized fuel, a first nozzle configured for providing a first fuel spray pattern, and a second nozzle configured for providing a second fuel spray pattern different from the first fuel spray pattern. The first and second nozzles may be configured to inject fuel supplied from a common source into a combustion space. The nozzles may be used in separate stages during the compression stroke of piston such that the first nozzle injects a predetermined amount of fuel in an early stage of the compression stroke, and the second nozzle at a later stage or at the end of the compression stroke.

U.S. Pat. No. 6,422,199 B1 discusses a fuel injector having a nozzle body with two valve needles in side-by-side configuration. The document discloses various alternatives for the use of the valve needles whereby it is possible to choose from which outlet opening to inject fuel, for how long and at which time. Further it has also been disclosed that both outlet openings may be open simultaneously.

Prior art, EP-A1-0 972 932, knows also fuel injection valves having two sets of injection openings. When lifting an injection needle member a small amount a first set of openings open and inject into the engine cylinder a small amount of fuel needed in low load operations. When the injection needle member is lifted further another set of openings is opened and more fuel is injected into the cylinder corresponding to full load operation. JP-A-62118055 teaches another injection valve structure comprising two sets of injection openings that can be opened separately. The two sets of injection openings are in flow communication with two injection valves arranged side by side in the same injector holder.

Also, injection valves having two injection needle members one inside the other have been discussed. DE-A1-10 2007 000 037, DE-B4-10 2007 000 095 and DE-C2-44 32 686 may be mentioned as examples of such fuel injection valve structures.

The use of an injection valve having a twin-needle structure as well as the use of two injection valves per each engine cylinder complicates the electronics and requires additional fuel lines and wiring in the surroundings of the cylinder head by doubling the components required for the fuel injection. In other words, each injection nozzle requires a control valve, a high-pressure fuel line from the common rail to the injection valve, a flow fuse in the high pressure fuel line, a low pressure fuel line for returning fuel and a wiring for the solenoid of the control valve. The flow fuse is a component installed between the common rail and the injection valve for detecting changes in flow pressure. For example, the flow fuse stops the feeding of fuel if the injection needle in the injection valve gets stuck so that it will not totally close i.e. the flow fuse prevent the injector from bleeding fuel into the cylinder continuously. Now that in modern engines there are two intake valves and two exhaust valves i.e. four valves per cylinder, the top surface of the cylinder head has to house these four valve stems and valve springs. Additionally, there are at least mounting blocks for the rocker shaft attached to the cylinder head, and sometimes also openings for the pushrods operating the rocker arms. And finally, in case it is a question of a dual-fuel engine there are means for admitting natural gas to the cylinder arranged to the top of the cylinder head. Thus, the space for the additional components a second fuel injection valve requires is very limited leading to structures that complicate the installation and maintenance work of the components at the cylinder head.

Another case where additional attention has to be paid to the emissions, and to the operating of the fuel injection valves relate to dual-fuel or tri-fuel engines i.e. engines that use both natural gas and light fuel oil or heavy fuel oil. The use of two injection valves, normally one smaller and another larger injection valve, per cylinder is already known in the dual-fuel engines. In normal continuous operation the natural gas is the main fuel, which is ignited in the engine cylinder by means of pilot fuel injected by means of the smaller injection valve. The larger injection valve finds its use most often in the starting phase of the engine, and it is used until the combustion is stable in each cylinder whereafter the gas admission may be started. Another, seldom occurring use of the larger injection valve is when the gas admission into the cylinders does not, for some reason, function properly. In such a case the larger injection valve is used to feed so called backup fuel into the cylinders. It is normal practice that the pilot fuel feeding system utilizes the common rail fuel feeding system. However, the backup fuel feeding system is the traditional injection system where for each cylinder, and each pump line nozzle, there is a jerk pump, and a pressure line from the jerk pump to the nozzle. In such a system each stroke of the jerk pump opens the pump line nozzleand injects a certain amount of fuel into the cylinder. Often, the fuel systems of the pilot fuel and the backup fuel are separate starting already from two different fuel tanks.

What the existence of the above-discussed fuel systems of a dual-fuel engine mean in practice is that, for each cylinder of an engine, the engine has to be provided, on the one hand, with the components required by the common rail system of the pilot fuel i.e. a flow fuse, a high pressure fuel line from the common rail fuel supply to the flow fuse, a control valve, high pressure fuel lines from the flow fuse to the injection valve, the injection valve itself and the low pressure fuel line from the injection valve to the low pressure fluid reservoir, and, on the other hand, components of the backup fuel system, i.e. the fuel injection pump for creating the injection pressure, the fuel line between the fuel injection pump and the injection valve, return fuel line from the fuel injection pump to the low pressure fuel reservoir and the injection valve. Thus it is clear that the room between the valve springs above the cylinder head is filled with different components, whereby both the installation and maintenance of the components is complicated.

Also, as already discussed above the conventional fuel injection system is susceptible to wear, which results in various problems in the use thereof. Expenses and risks involved in the use of injection pumps form yet another problem that requires attention. Naturally also the use of two liquid fuel systems side-by-side increases both expenses, risks of malfunction and space required by the systems.

An object of the present invention is to design the injection valve structure such that the number of components that have to be positioned in the surroundings of the cylinder head and the engine is reduced in comparison to prior art structures.

Another object of the present invention is to lower the emissions involved in the use of diesel fuel in dual-fuel engines and enable fast switching from pilot to main diesel mode.

Yet another object of the present invention is to lower the expenses involved in the use of diesel backup fuel in dual-fuel engines.

Still another object of the present invention is to minimize the risks of component failure involved in the use of diesel backup fuel in dual-fuel engines.

DISCLOSURE OF THE INVENTION

At least an object of the invention is met by a fuel injection unit suitable for assembly to a cylinder head and for injecting fuel to a cylinder of an internal combustion engine having a common rail fuel system with at least one high pressure fuel pump, the fuel injection unit connected to the common rail fuel system mainly comprising a first fuel injection valve with a first control valve, and a second fuel injection valve with a second control valve, wherein the fuel injection unit further comprises a high pressure fuel accumulator used for providing said first fuel injection valve and said second fuel injection valve with fuel.

At least an object of the invention is met by a method of operating the fuel injection unit of claim 1, the fuel injection unit connected to the common rail system being mainly constructed of at least a high pressure fuel accumulator specific for the fuel injection unit, a first fuel injection valve with a first control valve, and a second fuel injection valve with a second control valve, the method comprising the steps of Operating the fuel injection unit in one of
diesel mode
by using, in low load operations, the first injection valve as the sole fuel injection means,
by using, in full load operations, the second injection valve as the fuel injection means,
and gas mode
by using, in continuous operations, the first injection valve as the pilot fuel injection means,
by using, in gas fuel malfunction operations, the second injection valve as the main backup fuel injection means.

At least one object of the invention is met by the large internal combustion engine having a plurality of cylinders with cylinder heads and utilizing a common rail fuel system, wherein each cylinder head is provided with a fuel injection unit in accordance with any one of claims 1-13.

Other characteristic features of the fuel injection unit of the present invention and the method of operating such will become apparent from the appended dependent claims.

The present invention, when solving at least one of the above-mentioned problems, also brings about a number of advantages, of which a few has been listed in the following:

Simplifies the structure of the fuel system in both dual-fuel and diesel engines, a significant share of components of the present main and pilot fuel injection systems may be omitted and/or combined, Especially in dual-fuel engines, removes the need of arranging a jerk pump based fuel system for the feeding of backup fuel by utilizing the rail and flow fuse common to both pilot and main diesel modes, Reduces the costs of constructing the fuel system by eliminating a significant amount of components needed in prior art fuel systems, Simplifies the installation and maintenance of the fuel system, Reduces emissions especially in low load operations in both diesel engines and dual-fuel engines run in diesel mode, Reduces the pressure loss in the high pressure fuel line between the accumulator and the fuel injection valve by bringing them as close to each other as possible, Improves the needle opening, Improved response speed with solenoids and control valve orifice plates by fitting such directly above the nozzle needles, Improved multiple injection pressure spikes by reducing the amount and strength of pulses between the accumulator and the nozzle due to locating the accumulator close to the nozzle, Accumulator may be made smaller, when the accumulator is close to the injector nozzle, Smaller injection nozzle results in smaller sac volume, whereby less fuel is staying in the sac volume. As a consequence, the emissions are reduced.

However, it should be understood that the listed advantages are only optional, whereby it depends on the way the invention is put into practice if one or more of the advantages were obtained.

BRIEF DESCRIPTION OF DRAWING

In the following, the present invention is explained in more detail in reference to the accompanying FIGURE, which illustrates schematically the fuel feeding arrangement in accordance with a preferred embodiment of the present invention.

DETAILED DESCRIPTION OF DRAWING

In the attached FIGURE the fuel injection unit of the present invention is schematically illustrated. A high pressure fuel line introducing high pressure fuel oil from the common rail system of an internal combustion engine having a plurality of cylinders has been shown by reference numeral 2. The fuel line 2 preferably runs at the side of the cylinder head, though it may also be arranged to run either inside the cylinder head or on top of the cylinder head. The fuel injection unit of the present invention has a reference numeral 4, and it has been shown for clarity by means of a hatched box. Thus, the high pressure fuel line 2 feeds high pressure liquid fuel (either light fuel oil, heavy fuel oil, liquid bio fuel (LBF) or crude oil (CRO)) to the injection unit 4 by means of a connection pipe 6. Advantageously, the connection pipe 6 runs inside the cylinder head near the top surface thereof. The fuel injection unit 4 is provided with an accumulator 8 for receiving the high pressure fuel oil. The accumulator 8 is, in this embodiment, a lengthy pressure vessel that has been arranged in a substantially vertical position. The accumulator 8 may be arranged, if there is available space, more or less within the cylinder head. Though it is also possible that the accumulator is entirely above the cylinder head top surface. An essential feature of the fuel injection unit 4 of the present invention is that the entity aimed at providing an engine cylinder with all liquid fuel it requires is comprised of a single high pressure fuel accumulator 8 combined to at least two fuel injection valves 10, 12 and their control valves 14, 16.

Additionally, a single flow fuse 18 is arranged in the fuel feed line 20 between the high pressure fuel accumulator 8 and the fuel injection valves 10, 12. The purpose of the flow fuse 18 is to make sure that fuel is injected into the cylinder only when such is desired. It performs its task by detecting changes in flow pressure and it affects the flow in case of abnormal pressure drop conditions. For example, the flow fuse 18 stops the feeding of fuel to an injection valve if the valve is leaking, more generally, if any one of the injection needles of the injection valves downstream of the flow fuse is stuck open.

The fuel injection valves 10 and 12 as well as their control valves 14, 16 may, in connection with the present invention, be of any conventional structure. Thus, a general discussion concerning the structure and the operation of such is appropriate referring to the attached schematical FIGURE. The fuel injection valve 10 (used as an example, basically the structure and the operation of the injection valve 12 is similar) comprises a fuel injector body 22 having a fuel space 24 in which the rest of the members of the injection valve 10 are located. The fuel injector body 22 has at its end facing the combustion chamber of the engine cylinder provided with a nozzle body with nozzle tip 28 having outlet openings via which the fuel is injected into the engine cylinder. An injection needle 30 is arranged centrally in the fuel space 24. An end of the injection needle 30 (shown lower in FIG. 1) forms a needle valve member 32 that blocks the flow connection between the fuel space 24 and the injection nozzle openings unless the needle valve member 32 (together with the entire injection needle 30) is lifted off the seating surfaces near the nozzle openings. At the opposite end of the injection needle 30 the end of the needle is arranged slidably within a collar forming together with the end of the needle a cylindrical chamber 34 arranged in the fuel space in which chamber the full fuel pressure normally prevails. The fuel pressure acts on the upper end of the injection needle 30 in the chamber 34 and forces the injection needle 30 downwards that effectively means pushing the needle valve member 32 against the seating surfaces. In other words, the cylindrical chamber 34 is in direct communication with the high pressure fuel prevailing in the fuel accumulator 8 via a flow path in a valve orifice plate 38. Below the collar 36 there is a spring 40 arranged between a shoulder on the injection needle and the lower end of the collar to keep the collar against the valve orifice plate 38. The fuel space 24 of the fuel injector body 22 is in direct communication with the high pressure fuel supply i.e. the accumulator 8 via a high pressure fuel line 20/20' and flow fuse 18 such that full fuel pressure acts on all surfaces of the injection needle 30. The surfaces of the injection needle 30 opening at the fuel space 24 have been dimensioned such that the fuel pressure in the interior 24 surrounding the injection needle 30 tends to lift the injection needle 30 and the needle valve member 32 upwards away from the nozzle openings. However, the force originating from the full fuel pressure acting onto the end of the injection needle in the cylindrical chamber 34 keeps the needle valve member 32 closed irrespective of the opposite force created by the fuel pressure acting on the injection needle surfaces in the fuel space 24.

The operation of the injection valve (10, 12) is guided by the control valve (14, 16) such that when fuel injection is desired the control unit of the engine activates, i.e. opens the control valve 14 by means of a solenoid. When activated, the control valve 14 opens a flow connection from the cylindrical chamber 34 above the injection needle end and via the valve orifice plate 38 to a low pressure fuel reservoir 42 along low pressure fuel line 44. Simultaneously the pressure in the chamber 34 is released, whereby the fuel pressure acting in the fuel space 24 of the fuel injector body 22 to the injection needle surfaces lifts the needle valve member 32 off the seating surfaces and the injection may start. When the injection is to be terminated the engine control unit allows the control valve 14 to return to its rest, i.e. to its closed position by cutting the current in the solenoid whereby the control valve blocks the communication from the cylindrical chamber 34 to the low pressure reservoir 42. At the same time the communication from the high pressure fuel reservoir 8 to the low pressure fuel reservoir 42 via the cylindrical chamber 34 and the valve orifice plate 38 is cut off, whereby the cylindrical chamber 34 at the upper end of the injection needle 30 is pressurized. The full fuel pressure acting on the end of the injection needle 30 forces the injection needle 30 and its needle valve member 32 down against the seating surfaces thereby blocking the connection between the fuel space 24 in the fuel injector body and the nozzle openings. As mentioned already earlier the operation and construction of the second injection valve 12 may be similar to that of the first one 10 discussed above.

The above discussed fuel injection unit 4 is arranged to be inserted through the cylinder head 46 such that the tips 28 and 48 of the fuel injection valves 10 and 12 extend into the combustion chamber substantially at the level of the cylinder head lower surface 26. If desired one tip may be arranged to extend deeper into the combustion chamber than the other tip. More generally speaking, the tip 48 of the larger nozzle or fuel injection valve 12 may extend at a different height measured from the lower surface 26 than the tip 28 of the smaller nozzle. However, in accordance with a preferred embodiment of the present invention the tip 28 of the smaller nozzle 10 is arranged at a smaller height from the lower surface 26 of the cylinder head 46 than the tip 48 of the larger nozzle 12.

In accordance with a preferred embodiment of the present invention the various components of the fuel injection unit 4 are arranged such that the injection needles of the two injection valves are arranged side by side in the unit, as both needles have to extend into the combustion chamber of the engine cylinder. However, the rest of the components may be positioned more freely. In other words, it is possible that the valve orifice plates 38 and 50 are physically side-by-side at the upper ends of the injection valves 10 and 12, but it is as well possible that one valve orifice plate is directly attached to an injection valve and the other to the other injection valve by means of fuel pipes. In a similar manner it is possible that the control valves 14 and 16 are directly attached to the valve orifice plates 38 and 50, but it is as well possible that at least one of the control valves, possibly both, are in communication with the valve orifice plate/s with fuel pipe/s. And finally, similar options apply to the positioning of the flow fuse 18. In other words, it may be directly fastened to at least one of the orifice plates. However, a more natural way of arranging the flow fuse 18 is to couple it with the accumulator 8, and arrange the connection to the valve orifice plates and to the fuel spaces of the injector bodies with fuel pipes. Thus there is a number of different alternatives of which one may choose whichever best fits to his needs.

FIG. 1 does not specifically explain or show the location of the fuel pressure accumulator 8 except that is above the control valves and the fuel injection valves. However, this is a natural configuration as it is the accumulator 8 that introduces the high pressure fuel via the flow fuse 18 to the fuel injection valves 10 and 12 and the valve orifice plates 34 and 50. In accordance with a preferred embodiment of the present invention, the fuel pressure accumulator for each cylinder is arranged at least partially within the cylinder head of the engine. In this manner the cylinder head construction enveloping the accumulator may serve e.g. as a supporting casing for the accumulator. However, it has to be understood that the accumulator may be positioned totally above the top level of the cylinder head 46, but it may as well be fitted within the cylinder head in the space allocated for the fuel injection unit provided that the size of the space is sufficient. In the above options the connection pipe 6 for the high pressure fuel runs preferably near (either above or below) the top surface of the cylinder head 46 and terminates to the high pressure fuel accumulator 8. However, it is also possible that the connection pipe 6 terminates in the high pressure fuel line 20 between the accumulator 8 and the flow fuse 18. A further feasible option is that the accumulator is arranged as an extension or replacement of the connection pipe 6 running in the nearhood of the top surface of the cylinder head 46. In other words, the accumulator may be positioned parallel (normally horizontally) with the top surface of the cylinder head either above or at least partially below the top surface of the cylinder head 46. Preferably the connection pipe 6 connects the accumulator 8 to the high pressure fuel rail running at the side of the cylinder head whereby all injection units 4 of the engine receive fuel at the same pressure. The rail would, then, be coupled to one or more high pressure fuel pumps creating the fuel pressure for the common rail system.

The control valves 14 and 16 are connected to the low pressure fluid source 42 by means of a flow channel 44. The flow channel 44 may be arranged to run at least partially within the cylinder head like the high pressure connection pipe 6 in one of the above discussed embodiments. However, the return flow channel may also run on top of the cylinder head 46 if such is desired. And finally, the control valves 14 and 16 are connected to the engine control unit (not shown) by means of a wiring (not shown).

The fuel injection unit of the invention will find use in many different applications, especially in both marine vessels and power stations. These two applications as well as the applications discussed in more detail in the following, however, have to be understood as mere advantageous examples of the vast number of different uses a compact twin-needle injection unit may be applied to.

The injection unit of the present invention may be used advantageously in large diesel engines using liquid fuels like light fuel oil, heavy fuel oil, liquid bio fuel (LBF) or crude oil (CRO) as their sole fuel. In such a case the smaller injection valve is used in low load operations, to which the larger injection valve cannot be adapted. By means of a smaller injection valve the adjustment and control of the injection may be performed more accurately thereby minimizing both the emissions, like smoke, HC and NOx and the fuel consumption. The main reason for all the advantages is that a smaller fuel injection valve has smaller injection openings in the nozzle tip, and a smaller sac cavity for residual oil remaining in the nozzle after termination of the injection. The sac is the cavity left between the injection needle seating surfaces and the injection openings. Other applicable uses of the smaller nozzle can be found in the start-up phase of the engine or when the engine is idling.

The injection unit of the present invention may also be used advantageously in large dual-fuel engines. Such engines are sometimes also called gas engines as their main fuel is normally natural gas. The gas is admitted into the engine cylinders together with combustion air through the intake valves of the engine. However, gas engines require so-called pilot fuel for igniting the gas. Both the gas admission and pilot fuel injection are electronically controlled. This ensures that the correct air-fuel ratio can be set for each cylinder individually and that the minimum amount of pilot fuel can be injected while ensuring safe and stable combustion. The fuel injection unit of the present invention offers an easy and simple way of ensuring the reliable and continuous operation of the engine in case a problem occurs in the gas admission system, or the engine will be driven in diesel mode for some other reason. By using the fuel injection unit of the present invention the larger injection valve may be used for injecting main fuel when the engine runs completely in diesel mode. Preferably, the smaller injection valve is used, at least from time to time, for cooling purposes irrespective of whether the engine is driven in gas or in diesel mode.

When running the engine in diesel mode i.e. when it is a question of a dual-fuel engine not using natural gas, for some reason, or an engine using merely light fuel oil, heavy fuel oil, LBF or CRO, the injection unit of the present invention may be used to provide different rate shape injection diagrams. This may be accomplished by timing the injections from the two injection valves properly. In other words, since the operation of the injection valves may be controlled separately it is possible to adjust the timing, duration and quantity of each injection individually, whereby optimal rate shaping is achievable. Thus, for instance, it is possible to adjust the injections from the two injection valves to take place sequentially, simultaneously or partially overlapping. Also, the injection unit of the present invention may be controlled to use so-called split injection whereby the injections from the two injection valves take place separately.

As to the dimensioning of the two injection valves, the following guidelines may be mentioned. In dual-fuel engines the smaller injection valve should be dimensioned, on the one hand, to be able to inject less than 1% pilot fuelling (meaning less than 1% of full load fuel consumption), and, on the other hand, up to about 30% for low load or idle operation in diesel mode. The correct dimensioning of the smaller injection valve results also in improvements in the control of NOx, HC and smoke emissions in low load operation. A feasible additional option is to provide the smaller injection valve also with smaller injection spray openings. This is especially advantageous as an ignition improver in dual-fuel gas mode operation as well as in low load diesel mode operation. Naturally, the larger injection valve should be able to cover the full 100% load in diesel mode operation.

And a final feature concerning the two injection valves is that the both injection valves may be arranged to inject fuel at regular predetermined and/or optimized intervals in both diesel and gas mode to prevent nozzle opening blockage from fuel coking problems. The intervals may be fixed for different running conditions, or the interval may be determined by the engine control unit specifically for each individual case.

It should be understood that the above is only an exemplary description of a novel and inventive fuel injection unit of an internal combustion engine and the method of operating such. It should be understood that though the specification above discusses a certain type of a fuel injection valve and a certain type of a control valve, the type of the valve does not limit the invention to the types discussed. For instance, the control valve may be closed, instead of opened, by the solenoid. In a similar manner, the closer structure of the fuel injection may be different from the one discussed above. The above explanation should not be understood as limiting the invention by any means but the entire scope of the invention is defined by the appended claims only. From the above description it should be understood that separate features of the invention may be used in connection with other separate features even if such a combination has not been specifically shown in the description or in the drawings.

The invention claimed is:

1. A fuel injection unit suitable for assembly to a cylinder head and for injecting fuel to a cylinder of an internal combustion engine having a common rail fuel system with at least one high pressure fuel pump, the fuel injection unit being connectable to the common rail fuel system, comprising:
   a first fuel injection valve with a first control valve, a second fuel injection valve with a second control valve, and a single common high pressure fuel accumulator separate from and in fluid communication with interiors of said first fuel injection valve and said second fuel injection valve, said single high pressure fuel accumulator used for providing said first fuel injection valve and said second fuel injection valve with fuel; and
   a flow fuse arranged downstream of, and in fluid communication with, said single, high pressure fuel accumulator between said accumulator and said first and second fuel injection valves, wherein the flow fuse is arranged to detect changes in flow pressure so as to affect the flow in case of abnormal pressure drop conditions and stops the feeding of fuel to the injection valve if the valve is leaking.

2. The fuel injection unit as recited in claim 1, wherein the accumulator is arranged in flow communication with a high pressure fuel pump forming a part of the engine's common rail fuel system.

3. The fuel injection unit as recited in claim 1, wherein the first fuel injection valve is a smaller one having smaller injection openings, and a smaller sac.

4. A method of operating the fuel injection unit of claim 1, the fuel injection unit connected to the common rail system being mainly constructed of at least a single high pressure fuel accumulator specific for the fuel injection unit, a first fuel injection valve with a first control valve, and a second fuel injection valve with a second control valve, the method comprising:
   Operating the fuel injection unit in one of
      diesel mode
         by using, in low load operations, the first injection valve as the sole fuel injection means,
         by using, in full load operations, the second injection valve as the fuel injection means,
      and gas mode
         by using, in continuous operations, the first injection valve as the pilot fuel injection means,
         by using, in gas fuel malfunction operations, the second injection valve as the main diesel fuel injection means.

5. The method as recited in claim 4, wherein, in diesel mode, sequencing the first and the second injection valves for providing different rate shape injection diagrams or split injection by means of arranging the injections from the injection valves to take place simultaneously, only in a partially overlapping manner or separately.

6. The method as recited in claim 4, wherein injecting fuel from the first injection valve and the second injection valve at certain intervals for preventing blockage of the valves.

7. The method as recited in claim 4, wherein, when running the engine at low load with liquid fuel, injecting at most 30% of the fuel required by full load operation by using the first injection valve, especially for minimizing smoke emissions.

8. A large internal combustion engine having a plurality of cylinders with cylinder heads and utilizing a common rail fuel system, wherein each cylinder head is provided with a fuel injection unit in accordance with claim 1.

9. A large internal combustion engine according to claim 8, wherein the accumulator is positioned parallel with the top surface of the cylinder head.

10. A large internal combustion engine according to claim 8, wherein the high pressure fuel accumulator is positioned at least partially within the cylinder head.

11. A large internal combustion engine according to claim 8, wherein the internal combustion engine is a dual-fuel engine, and that the first fuel injection valve is a pilot fuel injection valve.

12. A large internal combustion engine according to claim 11, wherein the second fuel injection valve is a main liquid fuel injection valve.

13. A large internal combustion engine according to claim 8, wherein each fuel injection valve has a nozzle tip, each of the nozzle tips being placed at different heights measured form a lower surface of the cylinder head.

14. A large internal combustion engine according to claim 13, wherein the tip of the first fuel injection valve is arranged at a smaller height from the lower surface of the cylinder head.

15. The fuel injection unit as recited in claim 1, wherein the first fuel injection valve is used in diesel operation for providing different rate shape injection diagrams or split injection.

16. The fuel injection unit as recited in claim 15, wherein, especially for minimizing smoke emissions when running the engine at low load with liquid fuel, the first fuel injection valve is designed to inject less than 30% of the fuel required in the engine's full load operation.

* * * * *